United States Patent [19]
Drouart et al.

[11] Patent Number: 5,522,007
[45] Date of Patent: May 28, 1996

[54] METHOD OF BUILDING UP AN OPTICAL FIBER PREFORM BY PLASMA DEPOSITION, AND AN OPTICAL FIBER OBTAINED FROM THE PREFORM BUILT UP BY THE METHOD

[75] Inventors: Alain Drouart, Nanterre; Benoit Gouez, Colombes; Bernard Jouvenel, Bures sur Yvette; Yves Lumineau, Eragny sur Oise; Max Matau, Villeneuve la Garenne; Pierre Ripoche, Pithiviers, all of France

[73] Assignee: Alcatel Fibres Optiques, Bezons Cedex, France

[21] Appl. No.: 355,336

[22] Filed: Dec. 12, 1994

[30] Foreign Application Priority Data

Dec. 14, 1993 [FR] France .................................. 93 15016

[51] Int. Cl.$^6$ ................................................. G02B 6/22
[52] U.S. Cl. .............................. 385/141; 65/391; 65/414; 385/128; 427/452
[58] Field of Search ............................ 385/123, 127, 385/128, 141, 142, 144; 65/385, 391, 413, 414, 421, 436; 427/162, 163.1, 163.2, 446, 452

[56] References Cited

U.S. PATENT DOCUMENTS

| 4,114,980 | 9/1978 | Asam et al. .............................. 385/127 |
| 4,206,968 | 6/1980 | Suganuma et al. ..................... 385/127 |
| 4,221,825 | 9/1980 | Guerder et al. ......................... 427/452 |
| 4,335,934 | 6/1982 | Black et al. ............................. 385/127 |
| 4,367,013 | 1/1983 | Guerder et al. ..................... 385/142 X |
| 4,689,212 | 8/1987 | Mansfield ................................ 427/452 |
| 4,822,136 | 4/1989 | Hicks, Jr. ................................. 385/142 |

FOREIGN PATENT DOCUMENTS

| 0173183A1 | 3/1986 | European Pat. Off. . |
| 0401742A1 | 12/1990 | European Pat. Off. . |
| 0477435A1 | 4/1992 | European Pat. Off. . |
| 2253723 | 7/1975 | France . |
| 2186992 | 8/1987 | United Kingdom . |

OTHER PUBLICATIONS

*Patent Abstracts of Japan*, vol. 5, No. 114 (C–64) 23 Jul. 1981 & JP–A–56 054 239 (NT&T Corp) 14 May 1981.
*Database WPI*, Week 8364, Derwent Publications Ltd., London, GB; and 86–221207 & JP–A–61 151 031 (Hitachi Cable KK) 9 Jul. 1986.
*Database WPI*, Week 9028, Derwent Publications Ltd., London, GB; AN 90–212437 & JP–A–2 141 437 (Sumitomo Electric Ind KK) 30 May 1990.
*Patent Abstracts of Japan*, vol. 7, No. 232 (C–190) 14 Oct. 1983 & JP–A–58 125 628 (Furukawa Denki Kogyo KK) 26 Jul. 1983.
M. Bredol et al, *Journal of Lightwave Technology*, vol. 8, No. 10, Oct. 1990, New York US, pp. 1536–1540.

*Primary Examiner*—John D. Lee
*Attorney, Agent, or Firm*—Sughrue, Mion, Zinn, Macpeak & Seas

[57] ABSTRACT

A method of using a plasma to build up an optical fiber preform consists in injecting hydroxyl ions in a controlled manner into the build-up silica that is deposited on the preform. The invention is applicable to the manufacture of optical fibers, in particular monomode fibers.

18 Claims, 2 Drawing Sheets

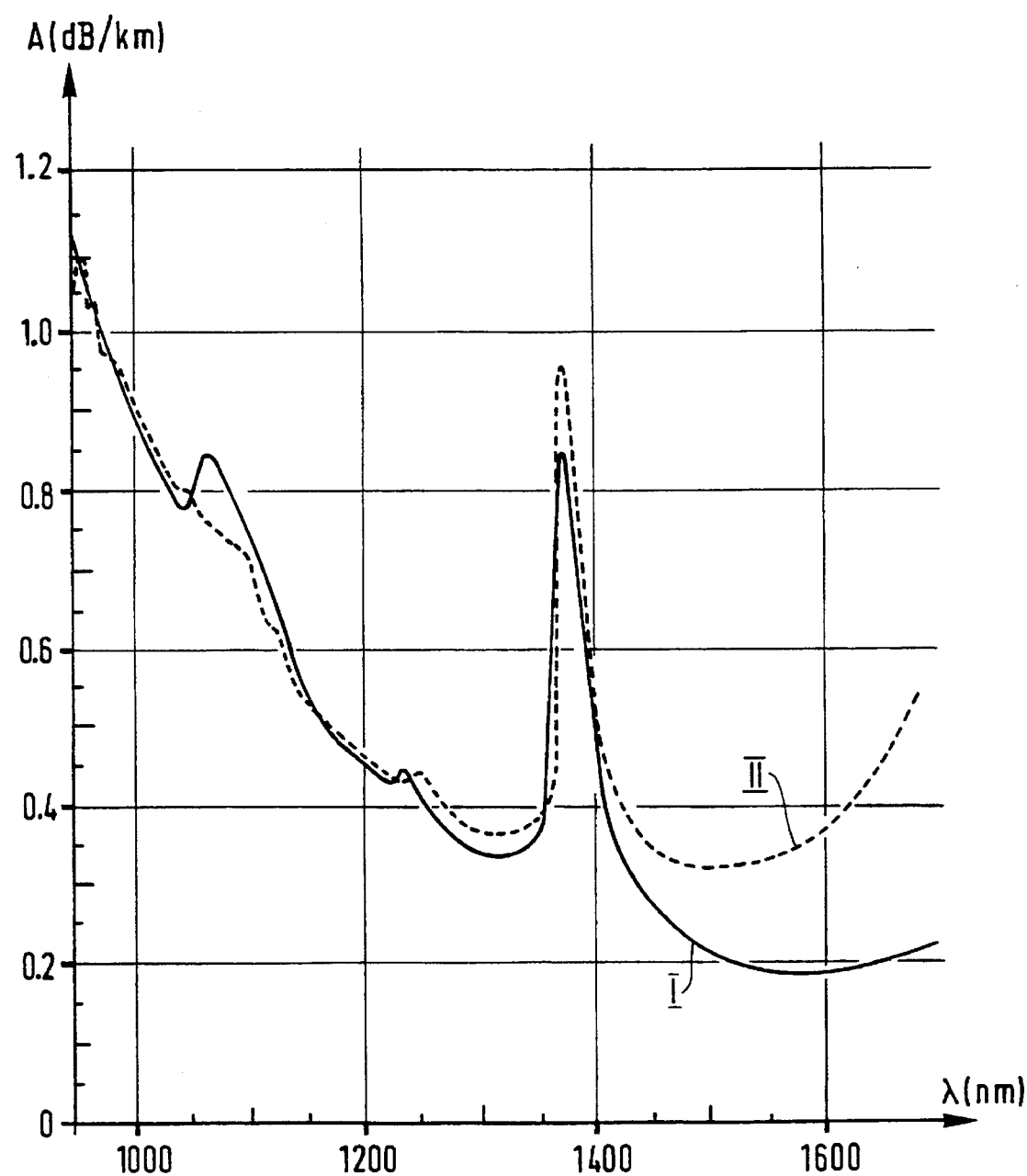

METHOD OF BUILDING UP AN OPTICAL FIBER PREFORM BY PLASMA DEPOSITION, AND AN OPTICAL FIBER OBTAINED FROM THE PREFORM BUILT UP BY THE METHOD

The present invention relates to making optical fibers from preforms that have been built up with pure silica or optionally with doped silica. More particularly, the invention relates to a method of building up an optical fiber preform by plasma deposition, and to an optical fiber obtained from the preform built up by the method.

BACKGROUND OF THE INVENTION

The technique of building up a "primary" preform by plasma deposition is relatively recent. It is used in particular for making monomode optical fibers. It makes it possible to obtain a preform of increased diameter after it has been built up, thereby making it possible to draw considerably longer lengths of optical fiber from the built-up preform.

The most commonly used prior technique for building up a primary preform is known as "sleeving". It consists in placing the primary preform in a tube selected to be of a kind that is as similar as possible to the outer layer of the primary preform, and in collapsing the sleeving tube onto the primary preform. Once the silica sleeving tube has been collapsed, that method makes it possible to obtain a final preform that has a diameter of about 40 mm, and it also makes it possible to obtain optical fiber, and in particular monomode fiber, by drawing fiber from the preform built up in that way, which fiber has acceptable attenuation at wavelengths that are useful for transmission purposes. However, that method has a main drawback of requiring a final operation of collapsing the sleeving tube onto the primary preform. It is also limited by the small range of sleeving tubes that are commercially available, which tubes are made essentially either of "pure" silica or else of silica that has been doped with fluorine. In order to ensure compatibility between the outer layer of the primary preform and the sleeving tube, that technique is usually applied to modified chemical vapor deposition (MCVD) primary preforms in which the optical cladding and the optical core are made in a commercially available tube of "pure" silica, and then using a sleeving tube which is likewise made of commercial "pure" silica.

In comparison therewith, the technique of building up a preform with pure silica or with doped silica by plasma deposition has the advantage of causing the building-up silica to vitrify directly on the primary preform. It also has the advantage of being capable of being implemented on a preform made by any of the various known methods, such as vapor axial deposition (VAD), outside vapor deposition (OVD), or modified chemical vapor deposition (MCVD), in particular. It thus makes it possible, as does the sleeving technique, to increase the thickness of the outer layer of the primary preform, with the material built up by plasma deposition then being as similar as possible to that of the outer layer of the primary preform. Another advantage over the sleeving technique is that it enables all of the outer covering of the final preform to be built up on a primary preform that initially comprises only the optical core and the optical cladding, or on a primary preform, in particular an MCVD preform, that initially comprised a tube in which the optical cladding and the core were made by internal deposition, after which the tube was collapsed and the material from the original tube was removed before the building-up operation. When all of the outer covering is made in this way, the build-up material is selected to have a refractive index that is suitably different from that of the optical cladding which it covers.

Until now, that technique of external plasma deposition of silica has been implemented while reducing as much as possible the presence of hydroxyl ions in the deposited silica.

Thus, document FR-A-2 253 723 describes a method of preparing a preform, particularly for implementing external deposition of silica on a tube or a rod, starting from a fine desiccated powder of pure silica, which is fed to the flame of a plasma torch, and using a plasma-generating gas, preferably argon, while protecting the deposited silica from any kind of pollution (and particularly OH-ion pollution) by installing the preform with its silica deposit in an oven enclosure in which a high vacuum is established.

The Applicant has observed that building up a relatively large thickness by plasma deposition in that way gives rise to a final preform, and thus to fibers derived from said final preform, in which attenuation is high. Attenuation increases as a function of the final diameter of the build-up preform and it rapidly becomes excessive, thereby putting a major constraint on the use of that technique in the past.

OBJECTS AND SUMMARY OF THE INVENTION

An object of the present invention is to build up primary preforms by plasma deposition to obtain built-up preforms capable of having a large final diameter, and to provide fibers derived from said built-up preforms that have entirely satisfactory low levels of attenuation, the plasma deposition also preferably being performed using grains of pure or doped silica so as to take advantage of the good deposition rate obtained and the relatively low cost of that raw material.

The present invention provides a method of building up an optical fiber preform by using plasma deposition, the method consisting in depositing build-up silica on the primary preform to be built up by means of a plasma torch, the method further consisting in injecting hydroxyl ions in controlled manner into said build-up silica so as to obtain an average hydroxyl ion concentration lying in the range 50 parts per million (ppm) to 100 ppm in the built-up silica deposited on said primary preform.

The present method advantageously further includes at least one of the following additional characteristics:

controlled injection of said hydroxyl ions into the build-up silica is performed substantially at the plasma torch while building up is taking place, and preferably with the help of a plasma-generating gas, with said gas being, in particular, humidified or conveying atoms or elements as required for forming hydroxyl ions in the plasma torch;

the controlled injection of hydroxyl ions into the building-up silica is performed prior to building up and optionally during building up when the building-up operation is performed using grains of natural or synthetic silica or after building up when the building-up silica is deposited in the form of soot; and the injection of hydroxyl ions into the build-up silica is performed at a controlled level that is constant or progressive.

The invention also provides an optical fiber made from a primary preform built up with silica by the above method, the fiber comprising an optical core, optical cladding, and at least one outer silica covering, with the outer silica covering resulting from said primary preform being built up by plasma deposition, wherein the average concentration of hydroxyl ions in said outer covering lies in the range 50 ppm to 150 ppm.

In particular, said outer covering of silica may have a hydroxyl ion concentration that varies progressively, comprising an innermost first layer having a hydroxyl ion concentration of less than 50 ppm and a second layer on the first having greater thickness than the first and having a hydroxyl ion concentration lying in the range 50 ppm to 250 ppm.

The outer coating may include a third, outermost layer having a hydroxyl ion concentration of less than 50 ppm.

BRIEF DESCRIPTION OF THE DRAWINGS

The characteristics and advantages of the present invention appear from the following description made with reference to the accompanying drawings. In the drawings:

FIG. 3 is a graph comparing attenuation curves of an optical fiber made from a preform built up by means of a plasma in accordance with the invention and of an optical fiber made from a preform built up by means of a plasma using a prior art technique.

DETAILED DESCRIPTION OF THE INVENTION

Figure 1:
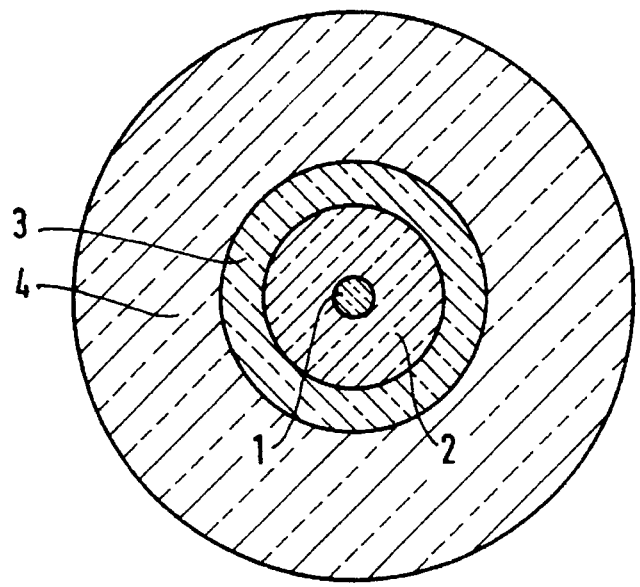
FIG. 1 is a diagrammatic section view through a built-up preform of the invention, or through an optical fiber made from said built-up preform.

With reference to FIG. 1, there can be seen a preform that has been built up in application of the invention (or an optical fiber made from said preform). It comprises an optical core 1, optical cladding 2, and an optical covering made up of two layers of pure silica 3 and 4 that are superposed one on the other. The preform is made by being built up using a plasma in accordance with the invention, for the purpose of depositing the outermost layer 4 on the layer 3, which layer 3 comes, in particular, from an MCVD primary preform and constitutes the tube of commercially "pure" silica in which the inner layers forming the optical cladding 2 and the core 1 have been deposited.

The core 1 and the optical cladding 2 are made of appropriate doped silica. Compared with each other and also compared with the covering constituted by the two layers of silica 3 and 4, they have refractive indices that differ in the well-known manner for obtaining an optical fiber preform.

Naturally, the optical covering shown that is made up of two pure silica layers 3 and 4 could be constituted by a single built-up layer of thickness corresponding to the overall thickness of the two layers 3 and 4 in the event that the primary preform does not include a layer 3 and is obtained by some known method other than the MCVD method, or by using the MCVD method and removing the layer 3 prior to building up the preform.

The final layer 4 of the optical covering, or the only layer thereof, as obtained by using a plasma to build up the primary preform, is made while deliberately injecting hydroxyl ions in a controlled manner into the silica that is being deposited for building-up purposes, and this goes against the teaching that has been generally accepted in the past.

This particular feature of hydroxyl ions being injected in controlled manner into the plasma-deposited build-up silica can be seen in the building-up method shown in FIG. 2 and described below.

Figure 2:
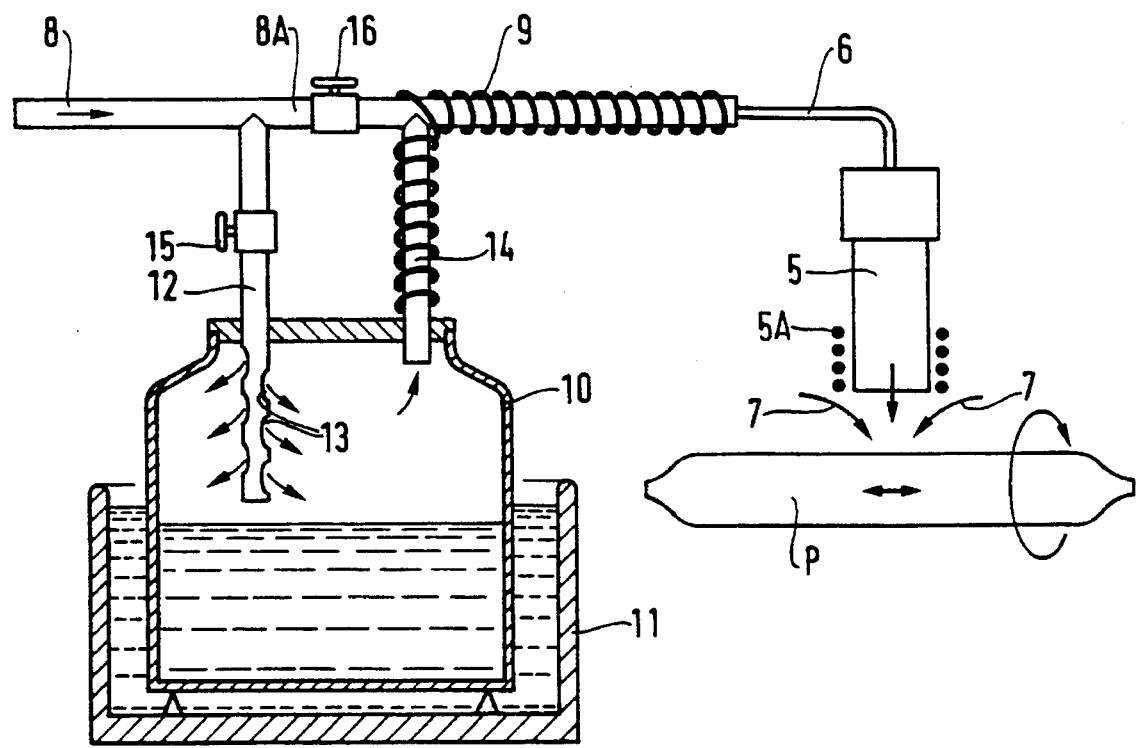
FIG. 2 shows a preferred way of using a plasma for building-up purposes in accordance with the invention.

In FIG. 2, there can be seen a plasma torch 5 together with its induction coil 5A which is associated therewith in known manner (with the electricity generator connected to said coil being omitted from the figure). There can also be seen a duct 6 that opens out into the end of the torch and that serves to convey a plasma-generating gas into the torch, and arrows 7 represent the injection of grains of natural or synthetic silica into the flame of the torch for the purpose of using such grains to build up the primary preform P. The duct 6 is itself connected to a plasma-generating gas feed duct 8. The feed duct is surrounded by a heating cord 9 which is wound at least round the end portion thereof that is connected to the duct 6. The feed duct 8 advantageously also has an inside diameter that is slightly greater than that of the duct 6. These dispositions of an installation for external deposition of silica by means of a plasma on a blank or on some other item, in particular a primary preform, are themselves well known and are therefore shown only diagrammatically. They enable silica grains to be fed to the flame so that molten silica is projected onto the primary preform which is mounted to rotate and also to move in translation past the flame, with the silica that is deposited on the sides of the primary preform vitrifying directly thereon.

Such an installation is known per se and is adapted for controlled injection of hydroxyl ions into the silica used for building-up purposes. In the example shown, a plasma-generating gas is used for controlled delivery of hydroxyl ions into the plasma torch while building up is taking place. To this end, the installation comprises a tank 10 containing water and water vapor which is placed in a vessel 11 containing a bath at a thermostatically controlled temperature that serves to maintain water vapor at higher than ambient pressure in the top portion of the tank 10.

The tank 10 is connected to the feed duct 8 via an inlet duct 12 whose terminal portion inside the tank 10 is relatively long and is pierced by multiple peripheral orifices 13 through which the plasma-generating gas is injected into the top portion of the tank. The tank is also connected to the feed duct 8 downstream from the inlet duct 12 via an outlet duct 14 for the plasma-generating gas which is now humidified. The inlet duct 12 is provided with a controlled valve 15 that regulates the flow of plasma-generating gas that penetrates into the tank 10 for humidification purposes. The feed duct 8 is fitted with another controlled valve 16 mounted on its portion 8A situated between the ducts 12 and 14 serving to switch off non-humidified plasma-generating gas or to regulate the flow thereof and the mixing thereof with the humidified plasma-generating gas coming from the duct 14. The duct 14 is provided with a heating cord which is the same as the above-mentioned cord 9 that is also wound around this portion of duct 14.

The various controls for the valves 15 and 16 and for thermostatically regulating the temperature of the bath in the vessel 11 are not shown. In practice, control is provided by an automatic central control unit. Control is performed to regulate the amount of water vapor entrained by the plasma-generating gas that is received in the plasma torch, with the quantity of entrained water being 200 grams per hour (g/h), for example, to obtain an average of about 100 ppm of hydroxyl ions trapped in the silica that is deposited on the primary preform.

The plasma-generating gas may be air, in particular, except while the plasma torch is being started, in which case the air is replaced in well-known manner by a flow of argon which is received on its own in the end of the torch. To this end, an additional duct (not shown) that opens out into the end of the torch can be provided for the purpose of delivering argon. In a variant, the duct 8 can also be used to feed argon, with the duct 12 then being closed.

Building up of the primary preform is initialized, i.e. it is begun, using non-humidified plasma-generating gas so as to obtain an initial build up of silica to a thickness of a few millimeters and having a concentration of OH-ions that is low, less than 50 ppm. Thereafter, deposition continues with the water vapor concentration in the plasma-generating gas at a level that is either constant or that varies continuously and progressively. Starting from a primary preform having a diameter of 18 mm, it is possible to obtain directly a preform having a diameter of 40 mm or even of 60 mm to 70 mm, with a high concentration of hydroxyl ions in the built-up silica, said concentration being constant after the initial build up and being about 100 ppm, or else varying progressively starting from 50 ppm and increasing to 200 ppm or 250 ppm going away from the initial build up. Build up may be terminated with a final build up of silica that is relatively thin and that has an OH-ion concentration that is relatively low, less than 50 ppm.

A preform built up in this way makes it possible to draw optical fibers of greater length and to obtain fibers presenting highly satisfactory levels of attenuation at wavelengths that are useful for transmission purposes. The attenuation levels are much lower than those of fibers made from preforms that have been built up without added humidity, even when the thickness of the layer built up by means of the invention is greater than that of the layer made without added hydroxyl ions.

In FIG. 3, solid line curve I is a plot of attenuation in dB/km as a function of wavelength expressed in nm for a fiber made from a preform that has been built up in application of the invention, whereas dashed line curve II shows the attenuation of a fiber made from a preform similarly built up with pure silica, but without added water vapor.

Curve I shows that the attenuation at 1310 nm is 0.32 dB/km and at 1550 nm is 0.195 dB/km, whereas in curve II, attenuation is 0.35 dB/km at 1310 nm and it is 0.316 dB/km at 1550 nm. Both of the curves I and II have an absorption peak at 1385 nm and that this peak is practically unaffected in curve I.

When using plasma deposition in accordance with the invention to build up an MCVD primary preform, it appears that the initial build up, although relatively small, encourages outwards migration of hydroxyl ions from the silica tube of the primary preform, and at least prevents migration towards the optical cladding and the core. Starting from said initial build up, it also appears that the high concentration of hydroxyl ions in the build-up silica imparts lower viscosity and better uniformity to the silica as it is being built up, thereby reducing differential stresses within the built-up layer and also relative to the covered layer, thereby avoiding any resulting internal stresses within the optical cladding and the core.

Not only is the building up of the primary preform by means of a plasma using silica grains and controlled addition of hydroxyl ions highly satisfactory with respect to the spectral attenuation of fibers obtained therefrom, but also it enables the cost of building up the preform to be reduced by a factor of three or four compared with the sleeving technique.

In a variant, the primary preform is built up by means of a plasma using grains of silica that have been doped, in particular with fluorine, and with hydroxyl ions being similarly incorporated in the doped build-up silica deposited in this way.

Also in a variant, instead of humidifying the plasma-generating gas, hydroxyl ions can be incorporated in the silica built up by means of the plasma by feeding hydrogen to the plasma torch or from hydrocarbons swept up by the plasma-generating gas, or by feeding the atoms or elements required for forming such ions immediately downstream from the torch into the molten silica projected onto the preform.

Also, in a variant, the hydroxyl ions may be injected prior to building up in controlled manner into the grains of silica which are then used for building up by means of plasma deposition.

In another variant, the build-up silica can also be obtained from a silicon compound and can then be deposited by the plasma torch on the preform in the form of soot which is then consolidated on the preform. Under such conditions, controlled injection of hydroxyl ions into the build-up silica can be achieved either during the consolidating operation which is then performed in an atmosphere containing atoms of H and of O, or else during the process of depositing the soot, by using a plasma-generating gas that is suitable for that purpose.

We claim:

1. A method of building up an optical fiber preform by using plasma deposition, the method comprising the steps of:

depositing build-up silica on the primary preform to be built up by means of a plasma torch; and injecting hydroxyl ions in a controlled manner into said build-up silica so as to obtain an average hydroxyl ion concentration lying in the range of from 50 ppm to 100 ppm in the build-up silica deposited on said primary preform.

2. A method according to claim 1, wherein said step of injecting further comprises injecting said hydroxyl ions into said build-up silica substantially at the flame of the plasma torch as said primary preform is being built up.

3. A method according to claim 2, further comprising using a plasma-generating gas containing the elements required for injecting a controlled quantity of said hydroxyl ions into said build-up silica.

4. A method according to claim 3, wherein the plasma-generating gas used is humidified upstream from said plasma torch.

5. A method according to claim 2, wherein said hydroxyl ions are injected into the build-up silica immediately downstream from said plasma torch.

6. A method according to claim 2, further comprising using a silica compound having substantially no hydroxyl ions as the raw material for obtaining said build-up silica that is deposited on the primary preform.

7. A method according to claim 1, wherein said step of injecting further comprises injecting said hydroxyl ions into said build-up silica which is deposited in the form of soot on said primary preform and then consolidated thereon, injection taking place during consolidation which is then performed in an atmosphere that includes atoms of hydrogen and of oxygen.

8. A method according to claim 1, wherein said hydroxyl ions are in a substantially constant quantity in said build-up silica.

9. A method according to claim 1, wherein said hydroxyl ions are in a quantity that varies through the thickness of the build-up silica.

10. A method of building up an optical fiber preform by using plasma deposition, the method comprising the steps of:

depositing build-up silica on the primary preform to be built up by means of a plasma torch;

injecting hydroxyl ions in a controlled manner into said build-up silica so as to obtain an average hydroxyl ion concentration lying in the range of from 50 ppm to 100 ppm in the build-up silica deposited on said primary preform, said step of injecting further comprising injecting said hydroxyl ions into said build-up silica substantially at the flame of the plasma torch as said primary preform is being built up; and using silica grains for constituting the build-up silica.

11. A method according to claim 10, wherein said step of injecting further comprises injecting said hydroxyl ions into said build-up silica by prior and controlled delivery of said hydroxyl ions into the silica grains used for said build-up silica.

12. A method according to claim 10, wherein said step of injecting further comprises injecting said hydroxyl ions into said build-up silica firstly prior to building up by feeding a fraction of said hydroxyl ions to said silica grains used for the build-up silica, and secondly by adding further ions while building up is taking place.

13. A method according to claim 10, further comprising using a plasma-generating gas containing the elements required for injecting a controlled quantity of said hydroxyl ions into said build-up silica.

14. A method according to claim 13, wherein the plasma-generating gas used is humidified upstream from said plasma torch.

15. A method according to claim 10, wherein said hydroxyl ions are injected into the build-up silica immediately downstream from said plasma torch.

16. An optical fiber made from a primary preform built up with silica by depositing build-up silica on the primary preform to be built up by means of a plasma torch, and injecting hydroxyl ions in a controlled manner into said build-up silica, the fiber comprising an optical core, optical cladding, and at least one outer silica covering, with the outer silica covering being the result of said primary preform being built up, wherein said outer silica covering has an average hydroxyl ion concentration lying in the range of from 50 ppm to 150 ppm.

17. An optical fiber made from a primary preform built up with silica, the fiber comprising an optical core, optical cladding, and at least one outer silica covering, with the outer silica covering being the result of said primary preform being built up, wherein said outer silica covering has an average hydroxyl ion concentration lying in the range of from 50 ppm to 150 ppm, wherein said outer silica covering has a hydroxyl ion concentration that varies progressively, the outer silica covering comprising an innermost first layer having a hydroxyl ion concentration that is less than 50 ppm, and a second layer covering said first layer having a thickness that is greater than the thickness of said first layer, and having a hydroxyl ion concentration lying in the range of from 50 ppm to 250 ppm.

18. An optical fiber according to claim 17, wherein said outer silica covering includes a third, outermost layer having a hydroxyl ion concentration of less than 50 ppm.

* * * * *